Figure 1:
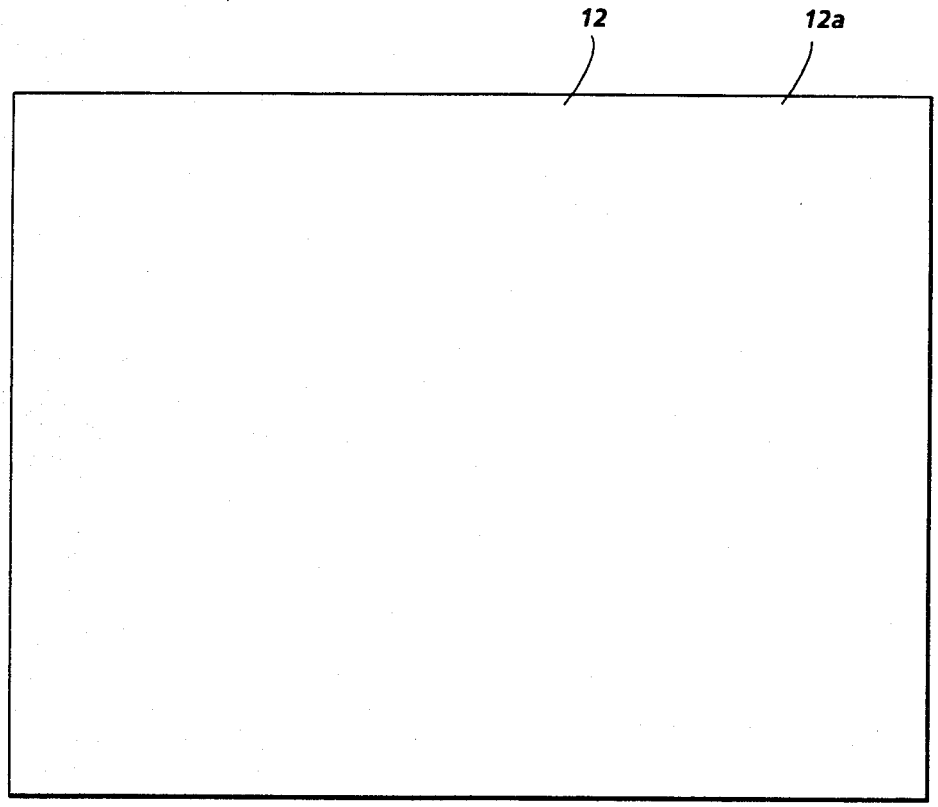

United States Patent [19]

Bristol et al.

[11] Patent Number: 4,834,502
[45] Date of Patent: May 30, 1989

[54] OPTICAL MOUSE PAD

[75] Inventors: Robert W. Bristol, Ontario; Harry C. Burch, West Henrietta; Gary L. Eisenhart, Pittsford; Randall R. Hube, Rochester, all of N.Y.; G. Christian Sherman, Orange, Calif.

[73] Assignee: Xerox Corporation, Stamford, Conn.

[21] Appl. No.: 229,192

[22] Filed: Aug. 8, 1988

[51] Int. Cl.$^4$ .............................................. G03F 5/00
[52] U.S. Cl. .................................. 350/322; 350/321; 340/710
[58] Field of Search ................ 350/322, 321, 1.1, 1.5, 350/318, 319, 276 R; 250/237 R; 340/710; 355/3 SC, 3 SH; 356/395; 358/252, 253

[56] References Cited

U.S. PATENT DOCUMENTS

| 3,258,341 | 6/1966 | Riemerschmid et al. | 350/322 |
|---|---|---|---|
| 3,749,471 | 7/1973 | Mallard | 350/321 |
| 3,905,822 | 9/1975 | Marks | 350/322 |
| 4,647,771 | 3/1987 | Kato | 250/237 R |

Primary Examiner—Bruce Y. Arnold
Assistant Examiner—Loha Ben
Attorney, Agent, or Firm—H. Fleischer; J. E. Beck; R. Zibelli

[57] ABSTRACT

A pad, used with an optical mouse, including a substantially transparent sheet having a pattern of spaced dots on one surface thereof. One surface of a bottom sheet is positioned adjacent to the surface of the transparent sheet having the dots thereon. The other surface of the bottom sheet has a coefficient of friction sufficient to minimize slippage of the pad when an optical mouse is moved therealong.

14 Claims, 2 Drawing Sheets

OPTICAL MOUSE PAD

This invention relates to a pad used in conjunction with an optical mouse for moving a cursor appearing on the screen of a cathode ray tube.

A mouse moves a cursor on a cathode ray tube in the direction of the X and Y axes. Movement of the mouse relative to a surface, i.e. a mouse pad, causes the cursor to move on the cathode ray tube. The mouse may either be a mechanical mouse or an optical mouse. The mechanical mouse typically employs a ball mounted in X and Y detecting rings. As the mouse moves along the surface, the ball rotates in the detecting rings. The cursor, on the cathode ray tube screen, moves a distance corresponding to the rotation of the ball in the detecting rings. An optical mouse uses photosensor to detect X and Y movement of the mouse along a grid pattern, or registers movement against a dot pattern. The location of the mouse on the pad is determined by the number of lines counted in the X and Y directions, or the relative movement of the mouse against the pad is determined by the number of dots. The position of the cursor on the cathode ray tube screen corresponds to the position of the mouse. An optical mouse is less expensive to manufacture in quantity and is inherently more reliable due to its solid state design. However, the mouse pad associated with the optical mouse is generally a paper based pad. These pads are not very durable and require a relatively hard, flat, work surface. The pad usually requires fastening to the work table to prevent sliding during its use. Once the pad is secured to the work table, it is difficult to change the pad location. The pad also abrades and soils easily. Accordingly, it is highly desirable to develop a durable readily movable pad for use with an optical mouse. Various types of optical mouse pads have been developed, the following disclosure appears to be relevant:

U.S. Pat. No. 4,647,771
Patentee: Kato
Issued: Mar. 3, 1987

The disclosure of the above-identified patent may be briefly summarized as follows:

U.S. Pat. No. 4,647,771 discloses an optical mouse associated with a mouse pad. The mouse pad has a transparent substrate with line patterns formed on the opposite sides of the substrate. The line pattern may be made semi-transparent by dotting minute or fine reflex points having an extremely high reflectivity. A light absorbing black rubber layer is secured to one surface of the transparent substrate. The rubber layer prevents the pad from sliding on a desk surface.

In accordance with one aspect of the present invention, there is provided a pad for use with an optical mouse. The pad includes a substantially transparent sheet having a pattern of spaced dots on one surface thereof. A bottom sheet having one surface with a coefficient of friction sufficient to minimize slippage of the pad when the optical mouse is moved therealong, has the other surface thereof positioned adjacent the surface of the transparent sheet having the pattern of spaced dots thereon.

Figure 2:
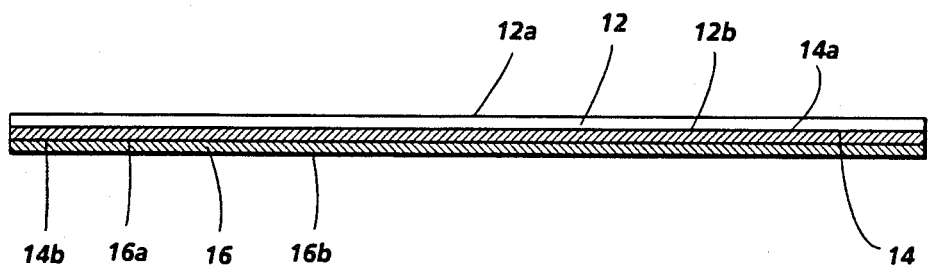
Figure 3:
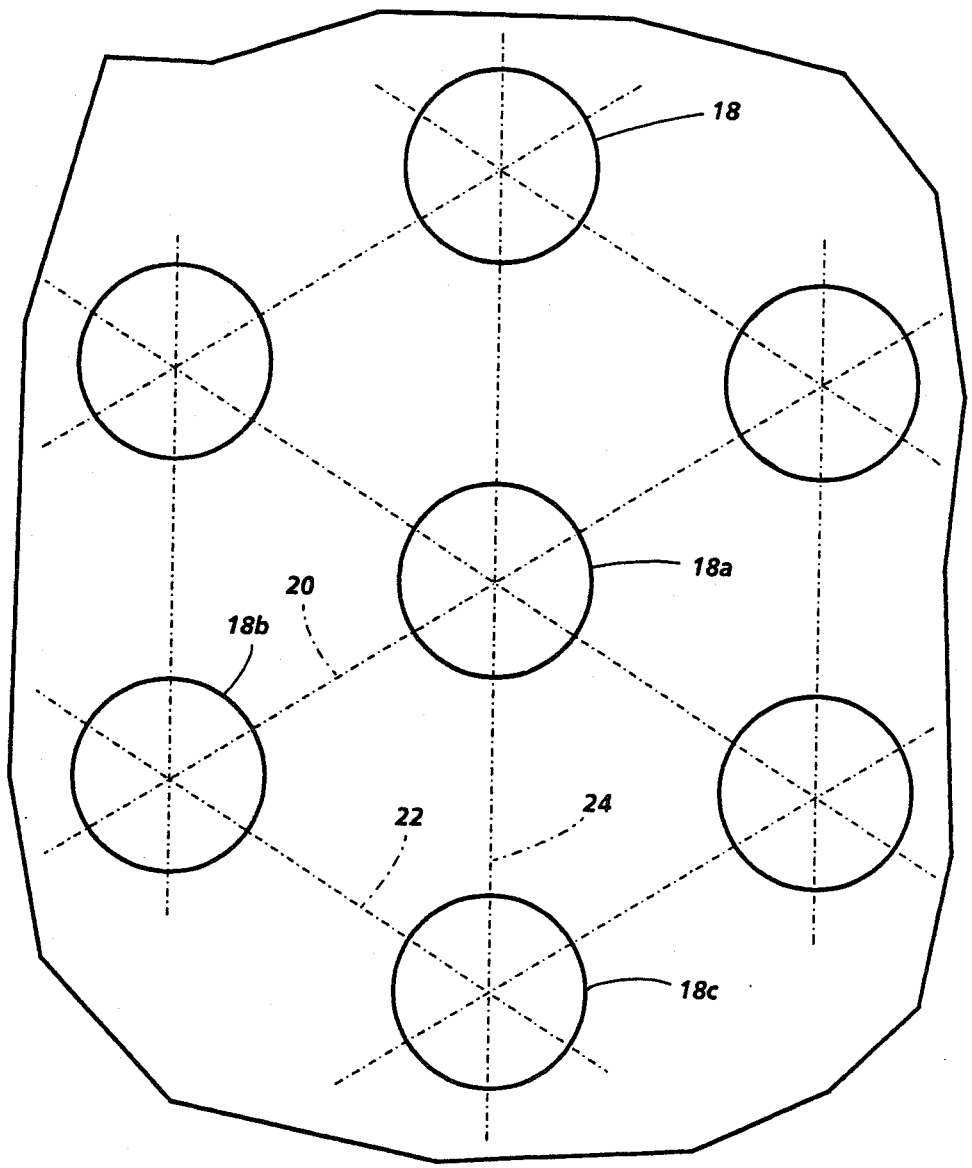

Other aspects of the present invention will become apparent as the following description proceeds and upon reference to the drawings, in which:

FIG. 1 is a plan view of the mouse pad;
FIG. 2 is a sectional elevational view of the FIG. 1 pad; and
FIG. 3 is a fragmentary, exploded view showing the dot pattern of the FIG. 1 pad.

While the present invention will hereinafter be described in connection with a preferred embodiment thereof, it will be understood that it is not intended to limit the invention to this embodiment. On the contrary, it is intended cover all alternatives, modifications and equivalents as may be included within the spirit and scope of the invention as defined by the appended claims.

For a general understanding of the features of the present invention, reference is made to the drawings. In the drawings, like reference numerals have been used throughout to designate identical elements. FIG. 1 depicts the mouse pad, indicated generally by the reference numeral 10. Preferably, pad 10 is 11 inches (27.9 centimeters) by 8.5 inches (21.6 centimeters). Pad 10 includes a substantially transparent sheet 12. Sheet 12 is the outermost sheet of pad 10. Preferably, sheet 12 is made from a polycarbonate material having a thickness ranging from about 0.005 inch (0.0127 centimeter) to about 0.010 inch (0.0254 centimeter). Sheet 12 is transparent to infrared energy. More particularly, sheet 12 has a transmissivity of about 90% or more for energy in the infrared wavelengths between 770 and 1200 nanometers. In this way, light rays reflected from the dot pattern on the pad are not in the visible spectrum insuring that undesirable light does not disturb the operator and cause eye fatigue. The exterior surface 12a of sheet 12 preferably has a fine velvet surface finish. The interior surface 12b (FIG. 2) of sheet 12 preferably has a matte surface finish. A pattern of dots (FIG. 3) is applied to the interior surface 12b of sheet 12. Preferably, the dot pattern is formed by lithographic printing of a black area and then overcoating the black area with a continuous layer of reflective white using a screen printing process. The result gives the appearance of white dots surrounded by a black area when viewed through the transparent sheet. Sheet 12 may be obtained from The General Electric Company under Product code No. 8B35-112.

Turning now to FIG. 2, there is shown a sectional elevational view of pad 10. As illustrated thereat, pad 10 includes a transparent sheet 12 having an interior surface 12b secured adhesively to surface 14a of support sheet 14. Sheet 14 provides structural rigidity for transparent sheet 12. This sheet does not have to be light absorbing as the white on transparent sheet 12 is sufficiently opaque to render the color of support sheet 14 not important. By way of example, sheet 14 may be made from a black vinyl compound. Sheet 14 has a thickness of about 0.030 inch (0.0762 centimeter). Surfaces 14a and 14b of sheet 14 preferably have a matte surface finish. Surface 14a of sheet 14 is secured adhesively to surface 12b of sheet 12 with surface 14b of sheet 14 being secured adhesively to surface 16a of sheet 16. Sheet 14 may be obtained from the Almac Plastics Company under the Product Code Black Vinyl 0.030" (matte both sides). Sheet 16 is an anti-slip sheet adapted to be placed on the desk or table top to prevent slipping of pad 10 as the mouse is moved therealong. Surface 16b of sheet 16 is adapted to be placed on the desk or table top. Sheet 16 has a thickness ranging from about 0.030 inch (0.0762 centimeter) to about 0.125 inch (0.3175 centimeter). Sheet 16 is made from a material having a coefficient of friction sufficient to prevent slippage of pad 10 along the desk or table top. Preferably, sheet 16 may be made from a mixture of cork and rubber, or a foam neoprene material. A suitable sheet made from a cork and rubber mixture may be obtained from Armstrong World Industries under the Product Code No. DC205. One skilled in the art will appreciate that the use of a separate support sheet is not critical to the present invention. If the combination of transparent sheet 12 and bottom sheet 16 have sufficient rigidity, sheet 14 can be eliminated.

Referring now to FIG. 3, there is shown a fragmentary elevational view showing the dot pattern applied to surface 12b of sheet 12. Each dot 18 is preferably about 0.008 inche (0.188 millimeter) in diameter. The distance between centers of adjacent dots 18 is about 0.0178 inche (0.452 millimeter). The dot pattern is such that a set of three adjacent dots having their centers connected by lines form an equilateral triangle. For example, lines 20, 22, and 24, connecting the centers of the set of dots 18a, 18b and 18c define an equilateral triangle having an included angles of 60°. These sets of dots are repeated to define the dot pattern applied to surface 12b of sheet 12. Each dot has an optical density less than 0.15 when measured with a microdensitometer conforming to American National Standard PH2.17 (1958). The background area surrounding the dots has a reflection density greater than 1.00 when measured with a microdensitometer conforming to American National Standard PH2.17 (1958). Thus, the dots reflect light with the surrounding background area being adapted to absorb light.

In recapitulation, it is clear that the optical mouse pad of the present invention includes a dot pattern printed under an infrared transparent protective sheet. The outer surface of a bottom sheet is an anti-slip surface to prevent slippage of the pad when the optical mouse is moved therealong. If additional rigidity is required, a stiffener or support sheet is sandwiched or interposed between the transparent sheet and the anti-slip bottom sheet. The resulting pad is durable and self supporting for use with an optical mouse.

It is, therefore, evident that there has been provided in accordance with the present invention, an optical mouse pad that fully satisfies the aims and advantages hereinbefore set forth. While this invention has been described in conjunction with a specific embodiment thereof, it is evident that many alternatives, modifications and variations will be apparent to those skilled in the art. Accordingly, it is intended to embrace all such alternatives, modifications and variations that fall within the spirit and broad scope of the appended claims.

We claim:

1. A pad for use with an optical mouse, including:
   a substantially transparent sheet having a pattern of spaced dots on one surface thereof; and
   a bottom sheet having one surface with a coefficient of friction sufficient to minimize slippage of the pad when the optical mouse is moved therealong with the other surface thereof being positioned adjacent the surface of the transparent sheet having the pattern of spaced dots thereon.

2. A pad according to claim 1, wherein each dot of the pattern of dots on said one surface of said transparent sheet is substantially light reflective.

3. A pad according to claim 2, wherein the surface of said transparent sheet having the pattern of dots thereon includes a substantially light absorbing area surrounding the pattern of dots thereon.

4. A pad according to claim 3, wherein the surface of said transparent sheet having the pattern of spaced dots thereon has a matte finish.

5. A pad according to claim 4, wherein the surface of said transparent sheet opposed to the surface having the spaced dots thereon has a velvet finish.

6. A pad according to claim 5, further including a support sheet interposed between said transparent sheet and said bottom sheet.

7. A pad according to claim 6, wherein the surface of said support sheet secured to said transparent sheet has a matte finish.

8. A pad according to claim 7, wherein the surface of said support sheet opposed to the surface thereof secured to said transparent sheet has a matte finish.

9. A pad according to claim 8, wherein the pattern of spaced dots on said one surface of said transparent sheet are substantially white.

10. A pad according to claim 9, wherein the area surrounding the pattern of spaced dots on said one surface of said transparent sheet is substantially black.

11. A pad according to claim 10, wherein said transparent sheet is made from a polycarbonate material.

12. A pad according to claim 11, wherein said support sheet is made from a vinyl material.

13. A pad according to claim 12, wherein said bottom sheet is made from a mixture of a cork and rubber material.

14. A pad according to claim 12, wherein said bottom sheet is made from a foam neoprene material.

* * * * *